United States Patent [19]

Dydzyk

[11] Patent Number: 5,062,087
[45] Date of Patent: Oct. 29, 1991

[54] HAND HELD ELECTRONIC GRADING LEVEL

[76] Inventor: Dmytro Dydzyk, 2548 W. Ball Rd., #138, Anaheim, Calif. 92804

[21] Appl. No.: 610,032

[22] Filed: Nov. 7, 1990

[51] Int. Cl.$^5$ ............................................. G01S 15/00
[52] U.S. Cl. ...................................... 367/99; 367/910; 367/108
[58] Field of Search ......................... 367/99, 108, 910; 342/118; 356/4, 5, 379; 364/564

[56] References Cited

U.S. PATENT DOCUMENTS 4,730,190  3/1988  Win et al. .......................... 367/910

Primary Examiner—Daniel T. Pihulic
Attorney, Agent, or Firm—Hawes & Fischer

[57] ABSTRACT

A hand held electronic grading level which automatically and accurately calculates the grade of a ground plane and indicates whether said grade is level. The grading level comprises a telescopic site level and a sonar system that is coupled to a microelectronically controlled calculator and a digital read out display. The sight level permits the grading level to be aligned horizontally with a distant sight target. The sonar system then generates an acoustic pulse which is reflected off the ground plane and received at a detector. The elapsed time between the transmission and receipt of the acoustic pulse provides an indication of the vertical elevation from the gorund plane to the sonar system. This elevation is displayed and compared to the known elevation of the distant sight target. The deviation between the shot and known elevations is also displayed to indicate the actual grade of the ground plane and whether said ground plane is level.

15 Claims, 4 Drawing Sheets

HAND HELD ELECTRONIC GRADING LEVEL

BACKGROUND OF THE INVENTION

1. Field of the Invention

This invention relates to a hand held, electronic grading level comprising an ultrasonic ranging (i.e. sonar) system and a telescopic sight level for use by a grading engineer or grade checker to automatically and accurately compute the grade of a ground plane and indicate whether said ground plane is level or within accepted tolerance limits.

2. Prior Art

As is known to grading engineers, grade checkers, surveyors, and the like, an "eyeball" approach is commonly used to determine the grade and level of land under construction. More particularly, an engineer's stake is hammered into one end of the land and a colored ribbon, or the like, is tied to said stake to serve as a reference sight mark at an arbitrary elevation. The grade checker then stands at the opposite end of the land and holds a plumb string to his eye while attempting to horizontally align his thumb with the target ribbon that is tied to the stake. In the alternative, a hand held peepsight is horizontally aligned with the target ribbon and a (e.g. six foot) ruler is used to measure the distance of the peepsight above the ground. By comparing the distance along the string or ruler with the elevation of the ribbon along the stake, an indication is obtained as to the grade of the ground plane located between the engineer's stake and the grade checker.

The foregoing "eyeball" approach is not always accurate, particularly when the ground plane to be checked is long and the grade checker is located far away from the engineer's stake. Therefore, inaccuracies are often introduced into the grade check which may result in the ground being overfilled or undercut. Such inaccuracies often occur as a consequence of the checker making erroneous mathematical calculations in his head and/or reading the ruler incorrectly or upside down, whereby to obtain a reverse grade. Obviously, the cost, lost time and waste of materials that can result from such miscalculations and inaccuracies can be extremely burdensome to a construction site that is under tight budget constraints, even if the grade error is relatively small.

It would therefore be desirable to have an apparatus by which to automate the method for checking grade, whereby to increase the accuracy of measurement and thereby avoid the expensive and time-consuming errors that are sometimes associated with the "eyeball" approach.

SUMMARY OF THE INVENTION

In general terms, a hand held, electronic grading level is disclosed having particular application for use by a grading engineer to automatically and accurately calculate and display the grade of a piece of land upon which the engineer is standing and verify that the cut/fill plane is level. The electronic grading level comprises a telescopic sight level, or peepsight, that permits the engineer to locate a distant target (e.g. a ribbon sight marker) that is affixed to an engineer's stake. The sight level includes a level indicating device to assure that the optical axis of the sight level is aligned parallel with the ground plane when the target is sighted. The grading level also comprises an ultrasonic sonar system which is adapted to transmit an acoustic pulse towards the ground plane and receive an echo pulse that is reflected therefrom. The sonar system is interfaced with a microprocessor controlled microcomputer which automatically computes the transit or elapsed time between the generation of the transmitted pulse and receipt of the reflected pulse. The transit time is proportional to the grade elevation from the ground plane to the sonar system. The microcomputer converts the transit time into a distance so that such information can be easily read at a microprocessor controlled display.

The display is interconnected with a calculator having a keypad by which arithmetic and control functions can be performed. For example, the grading engineer can store in the memory of the microcomputer a predetermined elevation corresponding to the known position of the target ribbon upon the engineer's stake. The microcomputer automatically compares the predetermined elevation of the target ribbon with the grade elevation that is shot by the grading level. The deviation between said shot and predetermined elevations is computed by the microcomputer to provide an indication of the actual grade and whether the ground plane is level. To this end, the predetermined elevation of the target stored in memory, the grade elevation shot and the deviation between the shot and predetermined elevations are displayed so as to obviate the need for rulers, plumb strings, mental calculations and the possible errors that are inherent therewith.

DESCRIPTION OF THE PREFERRED EMBODIMENT

Figure 1:
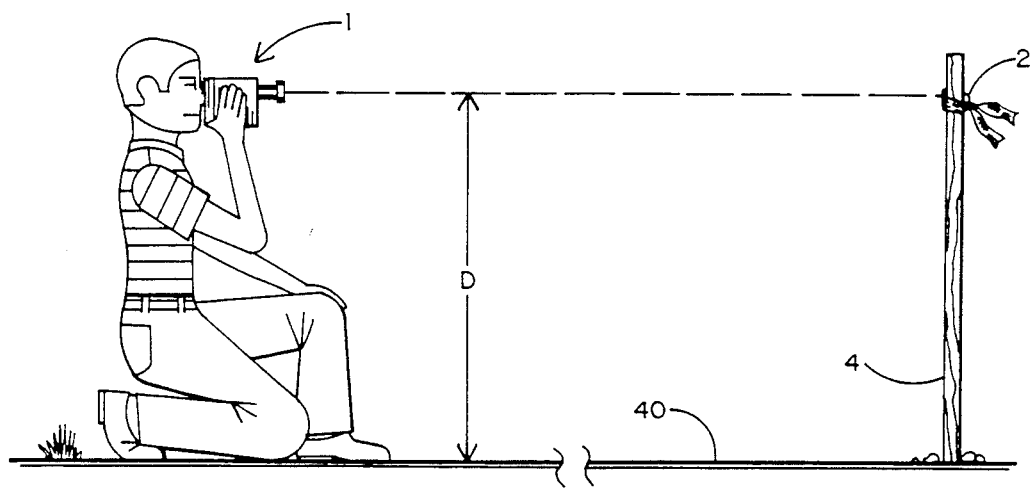
FIG. 1 shows the hand held, electronic grading level which forms the present invention aligned with a distant sight target to measure grade elevation.

The electronic grading level which forms the present invention is now described while now referring to the drawings, where FIG. 1 shows the grading level 1 being held up to the eye of a grade checker and aligned with a target (e.g. a ribbon sight marker) 2 that is affixed (i.e. tied) to an engineer's stake 4 at a distant location. By way of example, the grade checker typically stands from 10 to 150 feet from the stake 4. In FIG. 1, the grade checker positions his body so that the grading level 1 is aligned horizontally with the ribbon target 2 and parallel with the ground plane 40 upon which the checker stands. As will soon be described, means are included to insure a proper alignment of the grading level 1 with the sight marker 2 relative to the ground plane 40.

Figure 2:
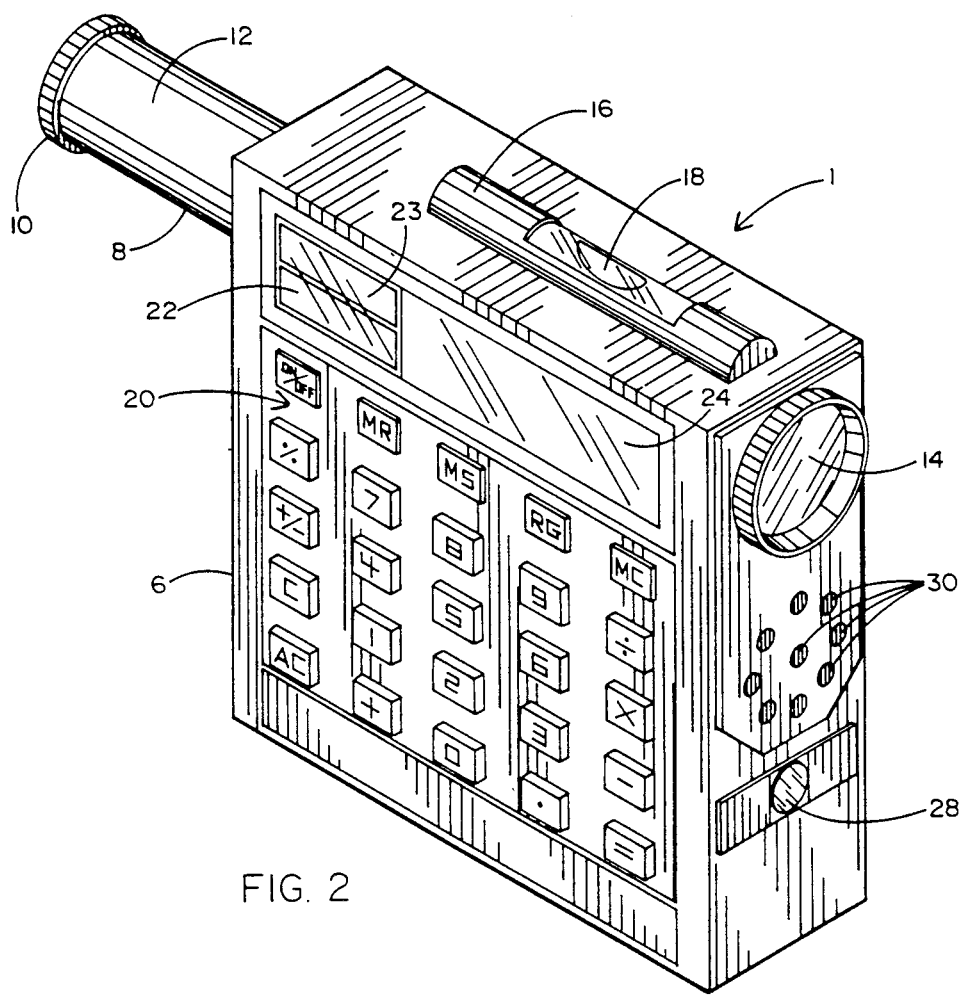
FIG. 2 is an enlarged, perspective view of the grading level of FIG. 1.
Figure 3:
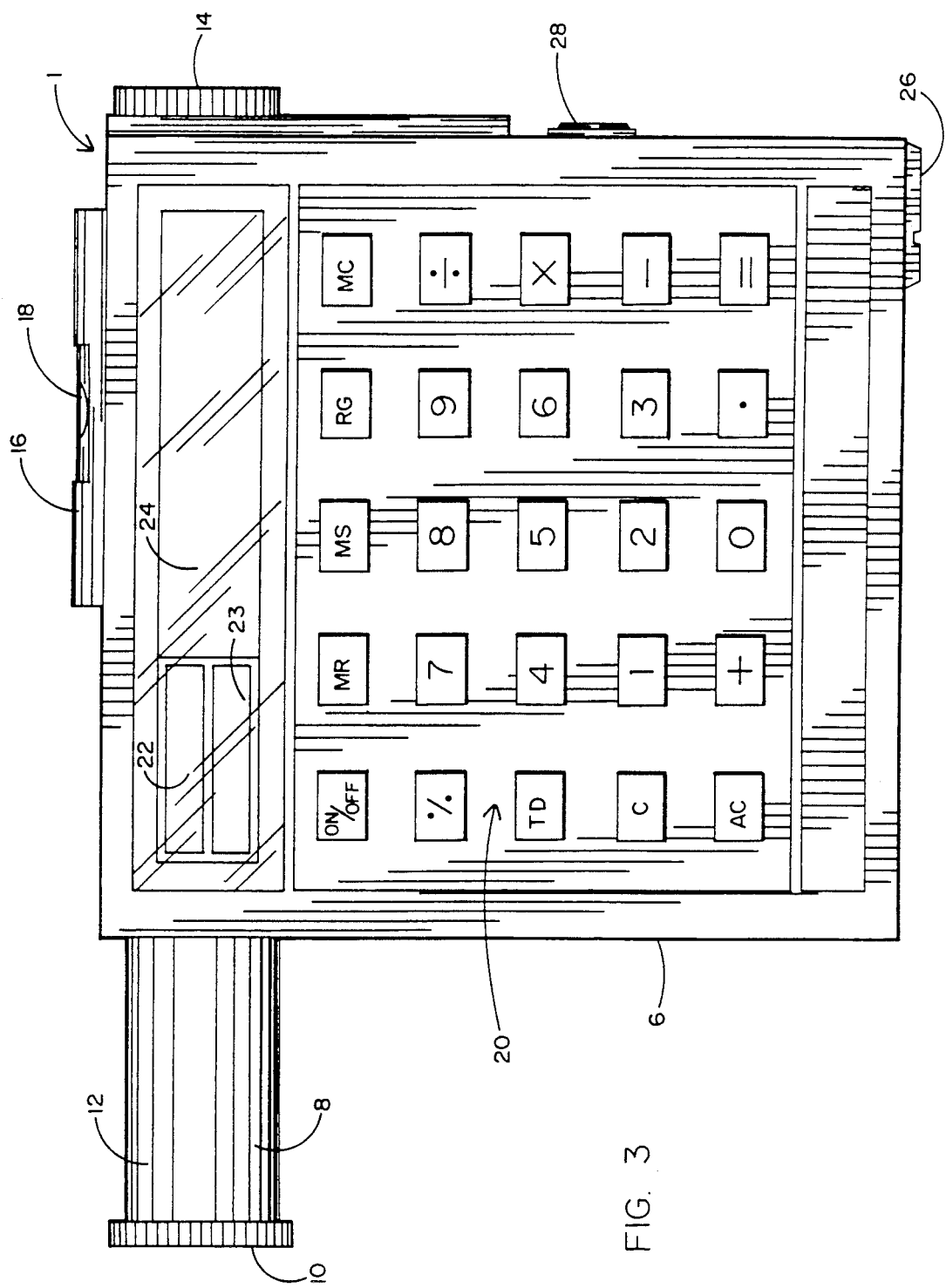
FIG. 3 is a front view of the electronic grading level.

More particularly, and referring concurrently to FIGS. 2 and 3 of the drawings, the electronic grading level 1 is shown comprising a compact housing 6 that may be easily transported and held in the hand of the grade checker. Integrated into the housing 6 is a commercially available sight level 8 (often referred to as a peepsight) that enables the grade checker to visually locate the sight marker and properly align the grading level 1 therewith. The sight level 8 includes an eyepiece 10, a tubular body 12 that extends through and is supported within body 6, and a lens system 14. Telescopic optics may also be used in conjunction with lens system 14 to help the grade checker easily find the ribbon sight marker 2 of FIG. 1 and aim the grading level 1 thereat such that the optical axis of sight level 8 intersects the distant target. Sight level 8 also includes a leveling device 16 which projects outwardly through an opening at the top of housing 6. Leveling device 16 is of conventional design and includes a vial 18 in which is housed a liquid and an air bubble that moves through the liquid relative to a crosswire to indicate to the grade checker when the grading level 1 is aligned parallel to the ground plane. Sight levels as just described which are suitable to be integrated into the housing 6 of electronic grading level 1 are available from David White Instruments of Menomonee Falls, Wis.

Also integrated into the housing 6 of electronic grading level 1 is a five function computer controlled calculator 20. Calculator 20 includes a keypad by which standard arithmetic and other soon to be described operations can be initiated. The calculator 20 has a plurality of (e.g. liquid crystal) displays 22-24 associated therewith at which information regarding the grade of the ground plane may be digitally displayed to the grade checker By way of example, a first display 22 can be set by the keypad of calculator 20 to indicate the known elevation of the ribbon sight marker at one end of the ground plane to be checked. The second display 23 will indicate the grade elevation shot by means of grading level 1 at the opposite end of the ground plane. Calculator 20 and, more particularly, the computer thereof, will automatically calculate, and the third display 24 will indicate, the deviation between the known elevation (shown at display 22) and the grade elevation shot (shown at display 23) The sign and magnitude of the number shown at display 24 can be easily interpreted by the grade checker as an indication of the actual grade and whether the ground plane is level.

As will be described in greater detail when referring to FIGS. 4-6, the electronic ground level 1 includes a sonar system that is located within housing 6 and adapted to transmit and receive acoustic pulses. To this end, an ultrasonic transducer, designated 26 and best shown in FIG. 3, projects outwardly from the bottom of housing 6 so as to be in spaced alignment with the ground plane below the grade checker's feet. A start button 28 is located at one side of the housing 6. When the start button is selectively depressed by the grade checker, the transducer 28 is excited and an acoustic pulse is transmitted to and reflected off the ground plane and returned to a receiver so as to provide grade information to be read out at the displays 23 and 24. A beeper (not shown) may be located within the housing 6 to sound an audible signal through a plurality of openings 30 formed in a side of said housing whenever the start button 28 is depressed, an acoustic pulse is generated, and corresponding digital grade information is made available at displays 23 and 24.

Figure 4:
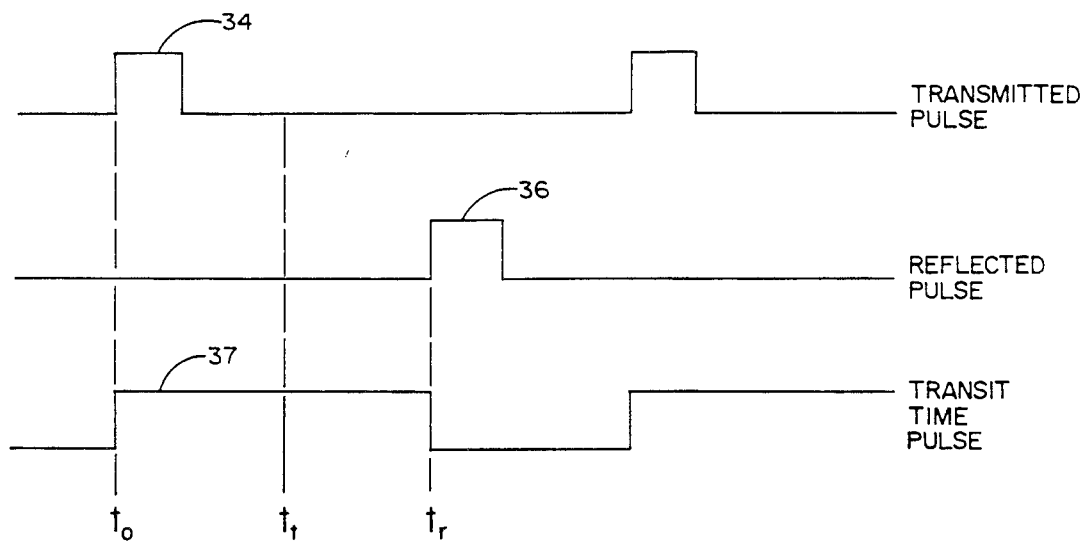
FIG. 4 illustrates the wave forms of acoustic pulses that are produced by an ultrasonic sonar system of the electronic grading level.
Figure 5:
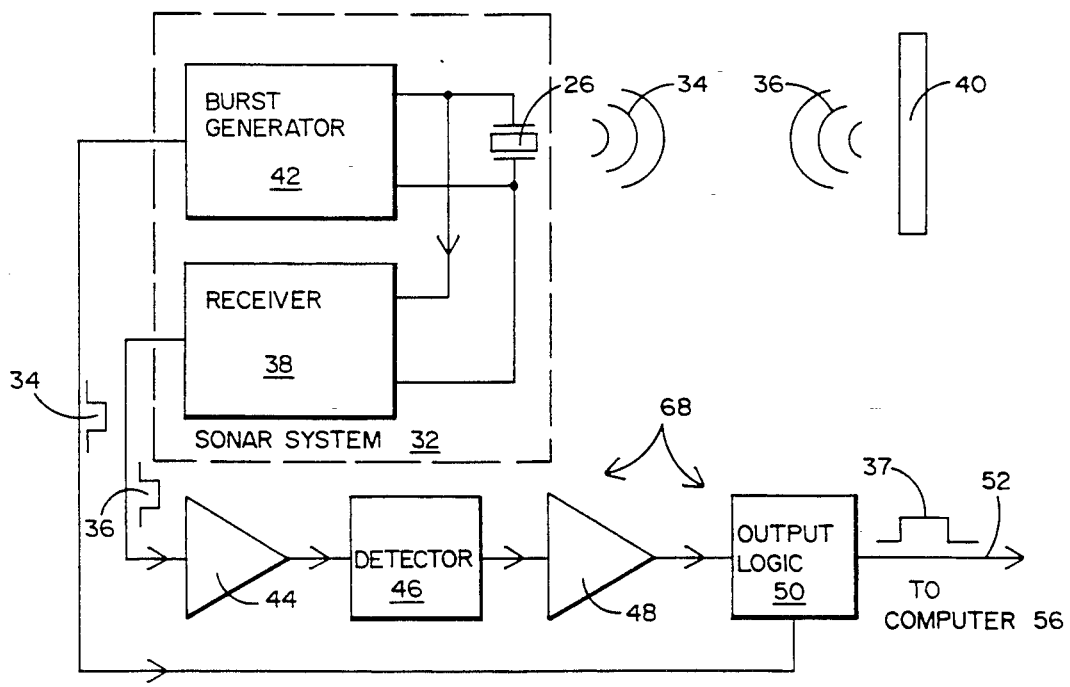
FIG. 5 is a block diagram of the sonar system and signal processing means therefor which generate and receive the acoustic pulses of FIG. 4.

The operation of the electronic grading level 1 of the present invention is now described while referring to FIGS. 4 and 5 of the drawings. Grading level 1 includes a sonar system 32 having the ultrasonic transducer 26 (previously referred to in FIG. 3) by which to transmit an acoustic pulse 34 and a receiver 38 at which to receive an echo pulse 36 that is reflected from the ground plane 40. The ultrasonic transducer 26 may be a piezoelectric device that is driven or excited by a burst generator 42. The purpose of sonar system 32 is to produce timing signals that can be processed to measure the vertical distance (designated D in FIG. 1) between transducer 26 and ground plane 40 and thereby provide information regarding the grade of said ground plane. A sonar system 32 such as that just described is available from Polaroid Corporation and known commercially as an ultrasonic ranging system.

The distance D, which is indicative of grade elevation, is proportional to the elapsed time between the generation of an incident acoustic pulse 34 transmitted by transducer 26 and the receipt of the reflected echo pulse 36 at receiver 38. That is to say, and as is best shown in FIG. 4, at time $t_0$, the start button (designated 28 in FIGS. 2 and 3) of grading level 1 is depressed, and the transducer 26 of sonar system 32 generates an incident acoustic pulse 36 which is transmitted towards ground plane 40. At time $t_t$, the transmitted pulse 36 is bounced off the ground plane 40, and, at time $t_r$, the reflected echo pulse 36 is received at the receiver 38. The width (i.e. elapsed time) between the leading edges of the transmitted and reflected pulses 34 and 36 defines a transit pulse 37 which is provided to the microcomputer 56 of calculator 20 (of FIG. 6) so that an indication of grade elevation may be automatically calculated and displayed.

Referring once again to FIG. 5, the reflected pulse 36 is supplied from receiver 38 of sonar system 32 to signal processors 68 including a non-inverting amplifier 44. Amplifier 44 has a suitably high gain to increase the magnitude of the reflected pulse 36 to approximately 4.0 volts to facilitate the detection thereof by a detector 46. The detector 46 is adapted to attenuate and smooth the shape of the output of amplifier 46 to form a square wave. A second non-inverting amplifier 48 receives the square wave output from detector 46 and boosts the signal level thereof to approximately 5.0 volts. Output logic 50 is connected to receive both the square wave output from amplifier 48 and the transmitted pulse 34. By way of example, output logic 50 may include a bistable circuit (e.g. flip/flop) which is set by the leading edge of the transmitted pulse 34 and reset by the leading edge of the amplified and attenuated reflected pulse 36.

The output from logic 50 is a digital signal (previously referred to in FIG. 4 as the transit time pulse 37), the width of which is proportional to vertical distance. That is, the transit time pulse 37 is supplied to the microcomputer 56 of calculator 20 (of FIG. 6) by way of a single sense line 52. The computer includes a counter-timer (not shown) that is responsive to and counts during the presence of transit time pulse 37. The final count (i.e. elapsed time) of the timer between the leading and trailing edges of transit time pulse 37 is converted into a measure of the distance (designated D in FIG. 1) from the ultrasonic transducer 26 of electronic grading level 1 to the ground plane 40. This distance is then read out at display 23 (of FIG. 6) to indicate the grade elevation shot and measured by the grading level. However, and as was previously described when referring to FIGS. 1-3, the optical axis of sight level 8, and not the ultrasonic transducer, is aligned with the ribbon marker 2. Therefore, an offset must be introduced to the readout of display 23 to compensate for this disparity between the grade elevation shot from the transducer and the true grade elevation relative to sight level 8.

What is more, the difference between the grade elevation shot by grading level 1 and the known elevation of the ribbon marker, as indicated at display 22 (also of FIG. 6), can be computed by microcomputer 56 and read out at display 24 (of FIG. 6) as the grade of ground plane 40. It is usually desirable that the readout of display 24 be close to 0 to indicate that the ground plane between the ribbon marker and grade checker is level. Nevertheless, and by virtue of the electronic grading level 1 of the present invention, the aforementioned indications of grade elevation and grade deviation are accurately and automatically computed without the use of a ruler and/or a plumb string and absent the need for the grade checker to make mental calculations.

Figure 6:
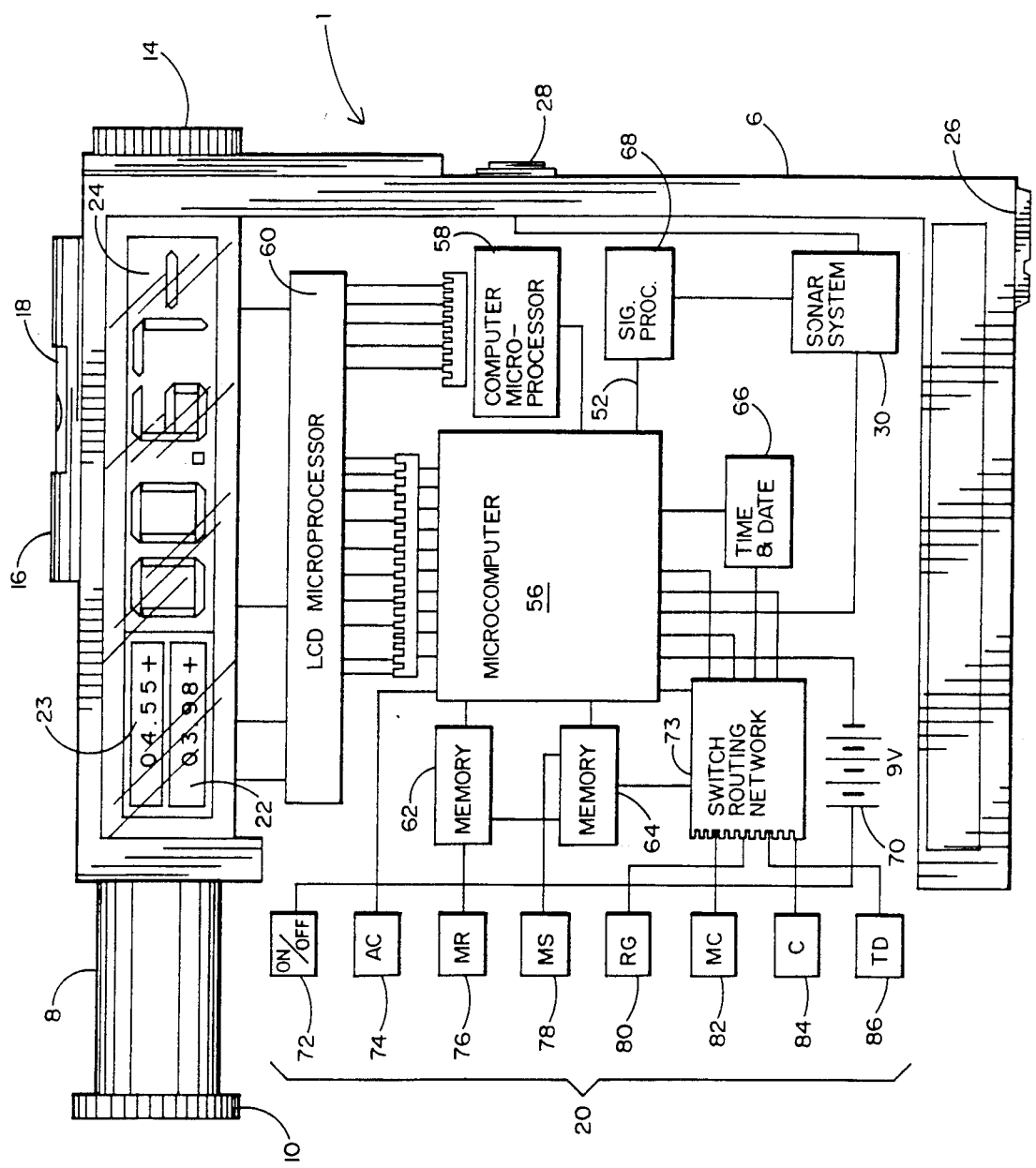
FIG. 6 is another block diagram that is illustrative of the overall electronic configuration of the electronic grading level.

FIG. 6 of the drawings illustrates the interconnection of the keypad of the calculator 20 with the electronic hardware and displays 22-24 of the electronic grading level 1 of the present invention to initiate various arithmetic and control functions. The electronic hardware of grading level 1 that is represented by the block diagram of FIG. 6 is conventional and consists of commercially available microelectronic devices. Therefore, these hardware devices will not be described in detail. The interaction between such electronic hardware, displays 22-24, and keypad is controlled by the internal microcomputer 56 of calculator 20 and the software programming of the microcomputer 56.

More particularly, microcomputer 56 is controlled by a computer microprocessor 58. The displays 22, 23 and 24 are all controlled by a display microprocessor 60. Each of microprocessor 58 and 60 are interconnected with one another and with microcomputer 56. A temporary memory 62 and a permanent memory 64 are connected between respective function keys 76 and 78 of the keypad of calculator 20 and microcomputer 56 so that information regarding the predetermined or known grade elevation can be entered, stored and displayed (at display 22). A free running clock 66 is also connected to the microcomputer 56 so that appropriate date and time information may be displayed by selecting a corresponding function key 86 from the keypad of calculator 20.

As previously indicated, the sonar system 30 is located within the housing 6 of grading level 1 and interconnected between the start button 28 and the microcomputer 56. Sonar system 30 includes the ultrasonic transducer 26 and receiver (designated 38 in FIG. 5) for transmitting and receiving acoustic pulses in the manner that was described while referring to FIGS. 4 and 5. As was also described when referring to FIGS. 4 and 5, the sonar system 30 provides acoustic information to signal processors 68, so that a transit time pulse (designated 37 in FIG. 4) can be generated and supplied to the microcomputer 56 via sense line 52, whereby to provide an indication of the grade elevation of transducer 26 relative to the ground plane with which said transducer is aligned. The calculator 20 is powered by a conventional 9 volt battery 70 which is connected between an on/off function key 72 of the keypad and microcomputer 56.

The use of the function keys on the keypad of calculator 20 to operate the electronic grading level 1 of the present invention is now described. As shown in FIG. 6, some of the function keys are connected to a switch routing network 73 which is responsive to selected ones of the keys being depressed for supplying corresponding command signals to the microcomputer 56. A function key 74, designated AC, is connected to microcomputer 56 and depressed at the beginning of the grade check to clear all of the displays 22-24 and the memories 62 and 64. A function key 76, designated MR, is connected to the temporary memory 62 and depressed when it is desired to input data thereto concerning the predetermined or known grade elevation of the distant sight marker (designed 2 in FIG. 1) relative to the ground plane to be checked. After key 76 is depressed, the numeric keys of the keypad (best shown in FIGS. 2 and 3) are selectively depressed to designate the required grade elevation. When a function key 78, designated MS, is depressed, the data held by temporary memory 62 is loaded into and stored in permanent memory 64. Likewise, the grade elevation data will be entered into microcomputer 56 and read out at display 22.

At this point, the sight level 8 which is integrated into housing 6 is used to visually align the grading level 1 with the distant sight marker. The start button 28 is then depressed, whereby an acoustic pulse is transmitted by ultrasonic transducer 26, and timing information which is indicative of the grade elevation of the transducer relative to the ground plane is supplied to the microcomputer 56 to be converted into a distance and read out at display 23. At the same time, the microcomputer 56 computes the deviation between the preset or desired elevation of the distant sight marker shown at display 22 with the existing elevation that is shot by grading level 1 and the shown at display 23, and difference therebetween is read out to display 24 as the true grade of the ground plane between the grading level 1 and the sight marker. As previously indicated, the sign and magnitude of the grade reading at the display 24 instantaneously informs the grade checker whether the ground plane is level, high or low. Normally, the measurements read at displays 22-24 are dimensioned in feet. However, by depressing and holding a function key 82 which is connected to the microcomputer 56 and designated MC, the measurements displayed would be automatically converted from feet to metric data. Releasing key 82 will cause the metric display to be converted back to feet.

When the grade checker moves to another station along the ground plane, a function key 80, which is connected to the microcomputer 56 and designated RG, is depressed to clear the displays 23 and 24 and provide information regarding the previous grade measured. A new grade elevation is then shot by depressing the start button 28 of grading level 1, and the corresponding new grade information is automatically computed and read out at displays 23 and 24. Information regarding the time and date is available by depressing the function key 86, designated TD.

Should it be desirable to move to an entirely new ground plane and take altogether different measurement, the AC function key 74 is depressed and all displays 22-24 and memories 62 and 64 are cleared of existing data. When it is desirable to use numeric keys of calculator 20 (best shown in FIGS. 2 and 3) to perform and display the results of arithmetic operations, a function key 84, designated C, is depressed to switch the grading level 1 out of the grade check mode and into a calculator mode, whereby the microcomputer 56 and display 24 become responsive to the depression of such numeric keys.

Hence, it may be seen that the hand held grading level 1 of the present invention is a convenient and efficient alternative to the conventional "eyeball" technique for computing the grade of a ground plane. Because the grade is automatically and electronically calculated, the risk of human error and the corresponding loss of time and money that might be associated therewith are advantageously reduced.

It would be apparent that while a preferred embodiment of the invention has been shown and described, various modifications and changes may be made without departing from the true spirit and scope of the invention. Having thus set forth a preferred embodiment, What is claimed is:

1. An electronic grading level to be positioned above a ground plane and aligned with a distant reference target that is supported at a predetermined elevation above the ground plane, said grading level adapted to provide an indication of the grade of the ground plane between said grading level and the reference target, and comprising:

optical means having an optical axis, said optical means being aimed at the reference target such that said optical axis thereof intersects said target;

level indicating means to provide an indication when the optical axis of said optical means which intersects the reference target is aligned parallel with respect to that portion of the ground plane which lies directly below said grading level;

signal generating means for transmitting an incident signal towards the ground plane to be reflected therefrom;

signal receiving means for receiving the signal reflected from the ground plane; and means responsive to the transit time between the transmission of said incident signal and the receipt of said reflected signal, said transit time being indicative of the elevation of said grading level above the ground plane, said responsive means comparing the elevation of said grading level with the predetermined elevation of the reference target for indicating whether the ground plane is level between said grading level and said target.

2. The grading level recited in claim 1, wherein said optical means is a sight level, the optical axis of said optical means corresponding to the line of sight of said sight level.

3. The grading level recited in claim 1, wherein said level indicating means is a fluid filled vial containing a movable air bubble and a cross wire, the position of the bubble relative to the cross wire indicating whether the optical axis of said optical means which intersects the reference target is aligned parallel with respect to that portion of the ground plane which lies directly below said grading level.

4. The grading level recited in claim 1, wherein said incident signal transmitted by said signal generating means and reflected to said signal receiving means is an acoustic pulse.

5. The grading level recited in claim 4, wherein said signal generating means includes a piezoelectric transducer and means for exciting said transducer for transmitting said acoustic pulse.

6. The grading level recited in claim 1, wherein said signal generating means and said signal receiving means include an ultrasonic transducer and receiver, respectively, and form a sonar system for transmitting an acoustic pulse incident signal and receiving an echo pulse reflected signal.

7. The grading level recited in claim 6, wherein said responsive means includes signal processing means interconnected with said signal generating means and said signal receiving means for producing a transit time pulse having a leading edge formed when said acoustic pulse is generated by said transducer and a trailing edge formed when said echo pulse is received by said receiver, the width of said transit time pulse being indicative of the grade elevation of said transducer above the ground plane.

8. The grading level recited in claim 7, further comprising keypad means to enter input data, display means to display output data, and computer means interconnected between said keypad means and said display means so that input data entered at said keypad means is displayed at said display means, said computer means also being connected to said signal processing means to receive the transit time pulse produced thereby for converting the width of said transit time pulse into output data corresponding to the grade elevation of said ultrasonic transducer, said computer means supplying said grade elevation output data to said display means.

9. The grading level recited in claim 8, wherein said display means includes a first display at which is read a measurement of the predetermined elevation of the reference target above the ground plane, information corresponding to said predetermined elevation being input to said computer means via said keypad means.

10. The grading level recited in claim 9, wherein said display means includes a second display at which is read the existing grade elevation of said ultrasonic transducer determined by said computer means and corresponding to the width of said transit time pulse received by said computer means from said signal processing means.

11. The grading level recited in claim 10, wherein said display means includes a third display at which is read the difference between the predetermined elevation of said reference target and the existing grade elevation of said ultrasonic transducer, said computer means calculating said difference and supplying corresponding output data to said third display.

12. A grading level to be positioned above a first end of a ground plane under investigation and having an optical axis that is aligned with and intersects a distant target that is supported at a predetermined elevation above the opposite end of the ground plane, said grading level adapted to provide and indication of the grade of the ground plane between the first and opposite ends threreof, and comprising:

level indicating means to provide an indication when the optical axis of said grading level which intersects the reference target is aligned parallel with the first end of the ground plane;

signal generating means for transmitting an incident acoustic signal downwardly towards the first end of the ground plane;

signal receiving means for receiving an echo signal reflected upwardly from the first end of said ground plane; and means responsive to the transit time between the transmission of said incident acoustic signal and the receipt of said reflected echo signal, said transit time being indicative of the elevation of said grading level above the first end of the ground plane and thereby providing an indication whether the ground plane is level between the first and opposite ends thereof, depending upon the predetermined elevation of the distant target at said opposite end.

13. The grading level recited in claim 12, wherein said signal generating means and said signal receiving means form a sonar system.

14. The grading level recited in claim 12, further comprising means to automatically compare the indicated elevation of said grading level above the first end of the ground plane with the predetermined elevation of the reference target above the second end of the ground plane for indicating whether the ground plane is level between said first and opposite ends.

15. The grading level recited in claim 14, further comprising display means at which to provide a visual indication whether the ground plane is level between the first and opposite ends thereof, said display means interconnected with said means to compare the indicated elevation of said grading level with the predetermined elevation of said reference target.

* * * * *